United States Patent Office 2,719,782
Patented Oct. 4, 1955

2,719,782
GEL FORMATION BY USE OF LANOSTEROL

Peter Vaterrodt, Rutherford, N. J., assignor to Botany Mills, Inc., Passaic, N. J., a corporation of New Jersey No Drawing. Application November 27, 1951,
Serial No. 258,537

2 Claims. (Cl. 44—7)

This invention relates to formation of gels and more particularly to the formation of gels from solvents by use of lanosterol.

It is an object of this invention to produce gels adaptable for use in incendiary bombs of the "Napalm" type.

Incendiary bombs of the "Napalm" type must have an easily dispersed gel, yet said gel must not be too fluid or runny but rather must be dispersed as a plurality of globs of sticky gel, so that the burning globs may firmly adhere to any surface of contact.

"Napalm" or jellied gasoline is prepared from gasoline and a mixture of different soaps, e. g. metal stearates, metal naphthenates, coconut oil soaps and the like in order to obtain the desired gel properties. In times of emergency or war these soaps, particularly naphthenates, are in short supply, hence if a single soap or a mixture of readily available soaps was found to produce the desired gel, a great economy of bomb costs would be effected.

According to this invention, a gel suitable for incendiary bombs can be prepared by incorporating lanosterol into a solvent such as benzene, ethyl acetate, and petroleum or equivalent hydrocarbons. As equivalent hydrocarbons one can use aromatic solvents or mixtures thereof with aliphatic compounds such as the paraffins, terpines or sesqui-terpenes. According to this invention, gels may be prepared from essential oils and can be used in the perfume industry. Furthermore, while gels prepared according to this invention may be used for incendiary bomb purposes, they also may be adapted for use as "solid fuel" for airplanes thereby avoiding leakage from bullet punctured fuel tanks.

The lanosterol used for gel formation of the hydrocarbon solvents of the low boiling type are obtained from wool grease. Also whereas the gel solvent used is preferably an inexpensive one such as any of the gasoline fractions, nevertheless, other solvents such as hexane, heptane, octane, terpenes, sesqui-terpenes and the like are also operable, and give satisfactory gels. Even varnish and painter's naphtha and Stoddard solvent may be gelled by the lanosterol of this invention.

The amount of lanosterol necessary for gel formation varies depending, for example, upon the consistency of the desired gel. An eight per cent solution of lanosterol in gasoline forms a viscous product which is still pourable whereas a fifteen per cent solution of lanosterol in gasoline is a solid product.

Where lanosterol is used, it is desirable to heat the resulting solution preferably under reflux for a few minutes. Such heated solutions show excellent gel properties on cooling.

Lanosterol is prepared by saponifying wool grease with sodium hydroxide, thereafter removing the lanolin acids as the insoluble calcium salt and removing the lanolin alcohols by a suitable solvent such as Acetone. The lanosterol is obtained from the lanolin alcohol filtrate by precipitation with acetone and methanol.

Example I 10 grams of lanosterol in 100 ml. of hexane are refluxed for about 5 minutes. Upon cooling a firm gel is obtained.

Example II 14 grams of lanosterol in 100 ml. of hexane are refluxed for about 5 minutes. Upon cooling a solid gel is formed.

Example III 12 grams of lanosterol, 100 ml. of V. M. & P. Naphtha are refluxed for 5 minutes. Upon cooling a solid gel is formed.

Example IV 12 grams of lanosterol in 100 ml. of ethyl acetate are refluxed for about 5 minutes. In this case a very viscose but still pourable gel is obtained.

This invention is of a broad scope and therefore has been described broadly and claimed broadly, and it is not to be limited to the hereinabove embodiments which are used merely by way of illustration.

Having described my invention, what I claim and desire to secure by Letters Patent, is as follows:

1. The method of forming gels consisting of adding 8–15% of lanosterol to a petroleum hydrocarbon.
2. The method of forming gels adaptable for use in incendiary bombs consisting of adding 8–15% of lanosterol to gasoline.

References Cited in the file of this patent

UNITED STATES PATENTS

| | | |
|---|---|---|
| 620,899 | Eckenberg | Mar. 14, 1899 |

OTHER REFERENCES

Hackh's Chemical Dictionary, 3rd ed., page 479.